C. E. NESS.
AUTOMOBILE FENDER.
APPLICATION FILED JAN. 12, 1915.

1,146,091.

Patented July 13, 1915.
2 SHEETS—SHEET 1.

Inventor
Charles E. Ness,
By Victor J. Evans
Attorney

Witnesses

C. E. NESS.
AUTOMOBILE FENDER.
APPLICATION FILED JAN. 12, 1915.

1,146,091.

Patented July 13, 1915.
2 SHEETS—SHEET 2.

Inventor
Charles E. Ness,
By Victor J. Evans
Attorney

Witnesses

UNITED STATES PATENT OFFICE.

CHARLES E. NESS, OF LA CROSSE, WISCONSIN.

AUTOMOBILE-FENDER.

1,146,091. Specification of Letters Patent. Patented July 13, 1915.

Application filed January 12, 1915. Serial No. 1,793.

*To all whom it may concern:*

Be it known that I, CHARLES E. NESS, a citizen of the United States, residing at La Crosse, in the county of La Crosse and State of Wisconsin, have invented new and useful Improvements in Automobile-Fenders, of which the following is a specification.

The invention relates to fenders, and more particularly to the class of automobile fenders.

The primary object of the invention is the provision of a fender of this character wherein on the turning of the wheels of the automobile the fender will be shifted laterally so as to project from the automobile forwardly thereof to prevent a person when being struck from falling beneath the wheels of the vehicle, the fender being of novel form and construction to assure positiveness in its operation.

Another object of the invention is the provision of a fender wherein a portion thereof can be released by the operator of the machine so as to fall into a position for preventing a person or object in the path of the vehicle being run over or coming in contact with the wheels of the vehicle.

A further object of the invention is the provision of a fender of this character wherein the front lamps of the automobile can be carried thereby so that the light rays therefrom will be thrown in the direction of travel of the vehicle, the fender being automatically shiftable laterally on the turning of the wheels of the vehicle for guiding the same in its course.

A still further object of the invention is the provision of a fender of this character which can be readily and easily applied to various types of automobiles and will operate for the safety of pedestrians or objects in the path of travel of the vehicle.

A still further object of the invention is the provision of a fender of this character which is simple in construction, possessing numerous points of efficiency and durability, and also one which is inexpensive in manufacture.

With these and other objects in view, the invention consists in the construction, combination and arrangement of parts as will be hereinafter fully described, illustrated in the accompanying drawings, and pointed out in the claims hereunto appended.

Figure 1:
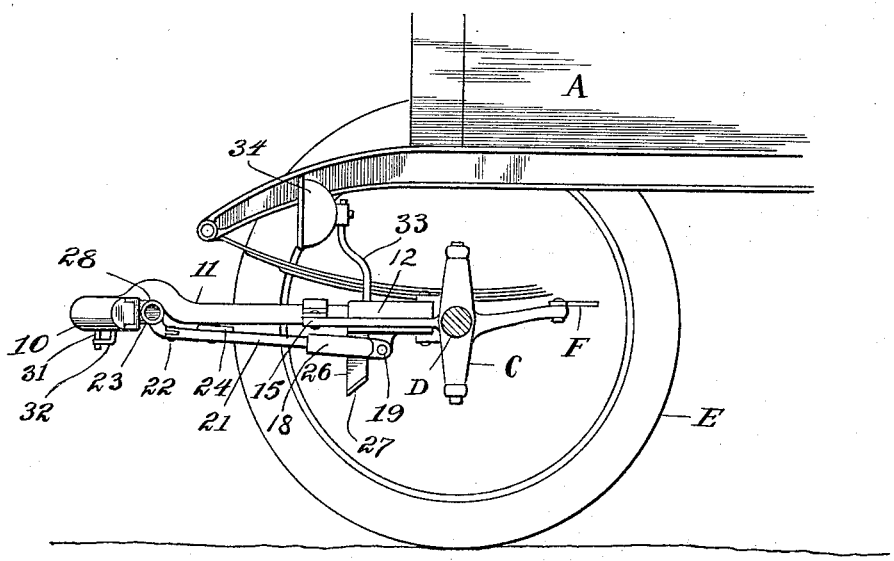
Figure 2:
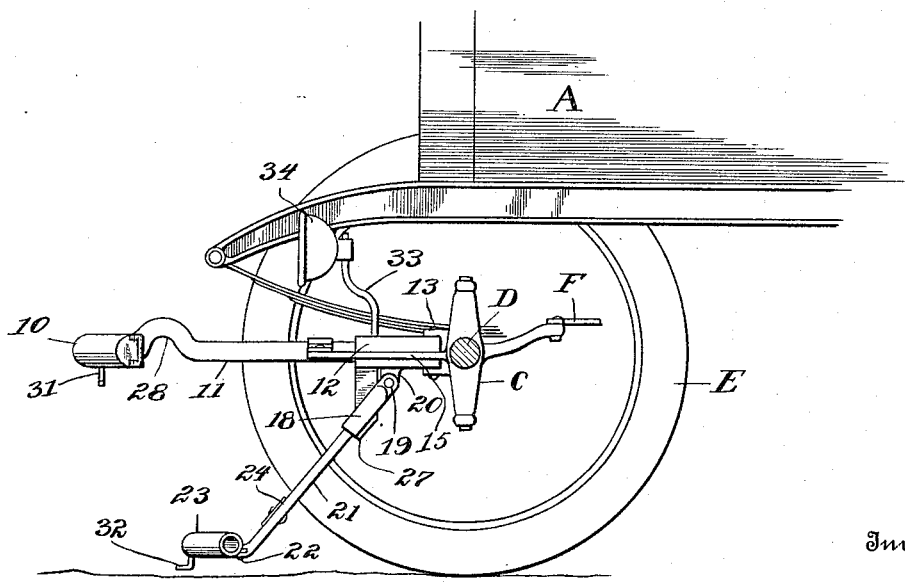
Figure 3:
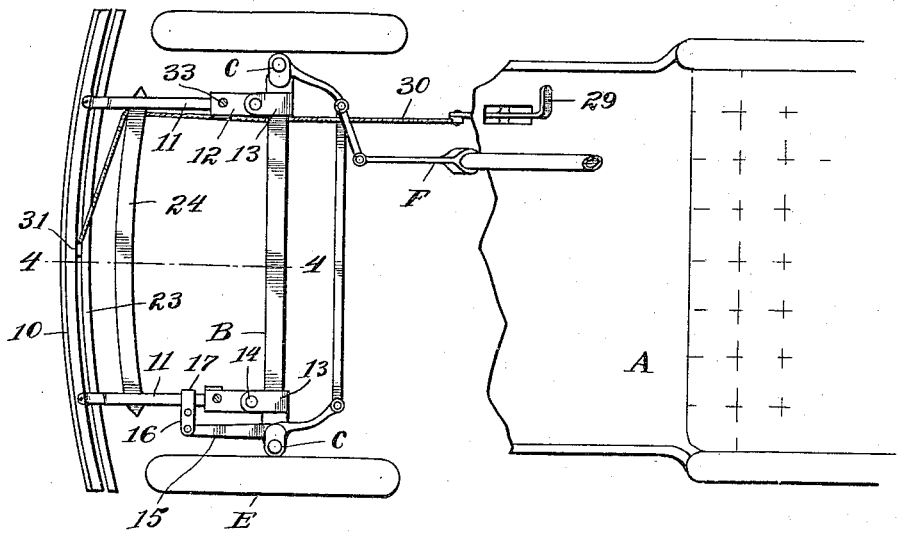
Figure 4:
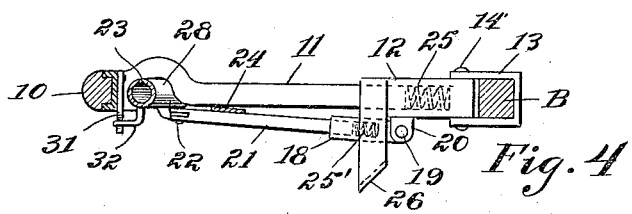
Figure 5:
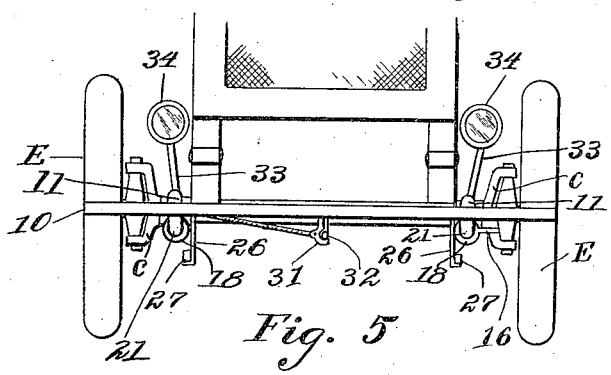

In the drawings:—Figure 1 is a fragmentary side elevation of an automobile, showing the fender constructed in accordance with the invention applied and in normal raised position. Fig. 2 is a similar view, showing one portion of the fender lowered to obstruct a person or object from contact with the wheels of the vehicle. Fig. 3 is a top plan view. Fig. 4 is a sectional view on the line 4—4 of Fig. 3, and Fig. 5 is a front elevation.

Similar reference characters indicate corresponding parts throughout the several views in the drawings.

Referring to the drawings in detail, A designates the body, B the front axle, C the turning knuckles having the spindles D on which are journaled the front turning wheels E, and F the steering mechanism of an automobile, to which is connected at its front the fender hereinafter fully described.

The fender comprises an outwardly bowed guard rail 10 having pivotally connected thereto guide stems 11 slidably telescoped within the hollow arms 12 swingingly connected in clips 13 clamped upon the front axle B, the arms being swingingly connected to the clips through the medium of pivots 14 so that the said arms can swing laterally in either direction. Formed on one of the knuckles C is a forwardly extending arm 15 to which is pivotally connected a link 16, the same being formed with a bracket 17 fixed to one of the stems 11 so that on the turning of the front wheels E the guard rail 10 will be automatically shifted laterally so that the said rail will be disposed in the path of travel of the automobile.

Supported by the hollow arms 12 is a drop frame comprising the hollow arms 18 which are connected through the medium of pivots 19 to ears 20 formed on the hollow arms 12, and in these hollow arms 18 are slidably fitted guide stems 21 pivoted at 22 to a drop rail 23, while pivotally clamped to the hollow arms 18 is an inner guard rail 24, the rail 23 being coextensive with the guard rail 10, while the rail 23 is of less length. The hollow arms 12 and 18 have fitted therein compression springs 25 and 25' which act upon the stems 11 and 21 to serve as shock absorbers, and thereby lessen the blow on the contact of a person or object with the guard rails 10 and 23, respectively.

Fixed to the arms 12 and depending therefrom are hangers 26 having hook ends 27 which limit the lowering of the drop frame, and also when in this position sustain the guard rail 23 contiguous to the ground so as to avoid the possibility of a person passing between the drop frame and the ground.

The stems 11 are formed with upwardly bowed portions 28 to accommodate the guard rails 23 so that the latter will lie in the same plane with the guard rail 10 when the drop frame is in raised position.

Mounted in the body A of the automobile, convenient to the operator of the same, is a foot lever 29 to which is connected a flexible member 30 which extends to a latch 31 pivoted to the guard rail 10 and engageable with a keeper 32 on the drop frame so that the latter is under the positive control of the operator. When it is desired to drop the said frame it is only necessary for the operator to move the foot lever 29, which releases the latch 31 from the keeper 32, thus freeing the drop frame, which will lower to the position shown in Fig. 2 of the drawings, and thereby prevent a pedestrian or object struck by the automobile from contacting with the wheels thereof.

Fixed in the arms 12 are lamp brackets 33 supporting lamps 34, it being seen that on the shifting of these arms 12 the lamps will be turned to throw their light rays in the direction of the travel of the vehicle. The vehicle is guided in its travel in the usual manner by operating the steering mechanism F, which is of any approved form.

What is claimed is:—

1. In a fender of the class described, the combination of an upper frame supported in substantially horizontal position and having a resiliently held guard rail pivoted for lateral movement, a lower fender frame pivotally supported on the upper frame and having a yieldable guard rail pivoted for lateral movement, means on the upper frame for locking the lower frame normally in a horizontal position, and an arm formed on the turning knuckle on the front axle of an automobile and connected with the upper frame for the shifting of both frames simultaneously on the guiding of the knuckle.

2. In a fender of the class described, the combination of an upper frame supported in substantially horizontal position and having a resiliently held guard rail pivoted for lateral movement, a lower fender frame pivotally supported on the upper frame and having a yieldable guard rail pivoted for lateral movement, means on the upper frame for locking the lower frame normally in a horizontal position, an arm formed on the turning knuckle on the front axle of an automobile and connected with the upper frame for the shifting of both frames simultaneously on the guiding of the knuckle, and lamp brackets supported on the upper frame.

3. In a fender of the class described, the combination of an upper frame supported in substantially horizontal position and having a resiliently held guard rail pivoted for lateral movement, a lower fender frame pivotally supported on the upper frame and having a yieldable guard rail pivoted for lateral movement, means on the upper frame for locking the lower frame normally in a horizontal position, an arm formed on the turning knuckle on the front axle of an automobile and connected with the upper frame for the shifting of both frames simultaneously on the guiding of the knuckle, lamp brackets supported on the upper frame, and manually operated means adapted to be mounted within the body of the autombile and having connection with the locking means for permitting the releasing thereof to free the lower frame to allow the same to gravitate to a forward inclination.

4. In a fender of the class described, the combination of an upper frame supported in substantially horizontal position and having a resiliently held guard rail pivoted for lateral movement, a lower fender frame pivotally supported on the upper frame and having a yieldable guard rail pivoted for lateral movement, means on the upper frame for locking the lower frame normally in a horizontal position, an arm formed on the turning knuckle on the front axle of an automobile and connected with the upper frame for the shifting of both frames simultaneously on the guiding of the knuckle, lamp brackets supported on the upper frame, manually operated means adapted to be mounted within the body of the automobile and having connection with the locking means for permitting the releasing thereof to free the lower frame to allow the same to gravitate to a forward inclination, and means on the upper frame for limiting the lowering of the lower frame.

5. In a fender of the class described, the combination of an upper frame supported in substantially horizontal position and having a resiliently held guard rail pivoted for lateral movement, a lower fender frame pivotally supported on the upper frame and having a yieldable guard rail pivoted for lateral movement, means on the upper frame for locking the lower frame normally in a horizontal position, an arm formed on the turning knuckle on the front axle of an automobile and connected with the upper frame for the shifting of both frames simultaneously on the guiding of the knuckle, lamp brackets supported on the upper frame, manually operated means adapted to be mounted within the body of the automobile and having connection with the locking means for permitting the releasing thereof to free the lower frame to allow the same to gravitate to a forward inclination, means on the upper frame for limiting the lowering of the lower frame, and axle clips adapted for embracing the front axle of the automobile and pivotally connected to the upper frame.

In testimony whereof, I affix my signature in presence of two witnesses.

CHARLES E. NESS.

Witnesses:
 Thos. H. Bailey,
 Edw. F. Weigel.